US011325652B2

(12) United States Patent
Heo et al.

(10) Patent No.: US 11,325,652 B2
(45) Date of Patent: May 10, 2022

(54) BODY FOR VEHICLE (71) Applicants: Hyundai Motor Company, Seoul (KR); Kia Motors Corporation, Seoul (KR)

(72) Inventors: Chul Hee Heo, Hwaseong-si (KR); Ho Yeon Kim, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 110 days.

(21) Appl. No.: 16/928,381

(22) Filed: Jul. 14, 2020

(65) Prior Publication Data
US 2021/0171110 A1 Jun. 10, 2021

(30) Foreign Application Priority Data
Dec. 5, 2019 (KR) .................. 10-2019-0160984

(51) Int. Cl.
*B60J 9/00* (2006.01)
*B62D 23/00* (2006.01)
*B62D 27/00* (2006.01)
*B62D 25/08* (2006.01)
*B62D 25/06* (2006.01)
*B62D 21/02* (2006.01)

(52) U.S. Cl.
CPC ........... *B62D 23/005* (2013.01); *B62D 21/02* (2013.01); *B62D 25/06* (2013.01); *B62D 25/08* (2013.01); *B62D 27/00* (2013.01)

(58) Field of Classification Search
CPC .......... Y02T 10/72; Y02T 10/64; Y02T 10/70; B60L 2200/26; B60K 1/00
See application file for complete search history.

(56) References Cited

U.S. PATENT DOCUMENTS

| | | | |
|---|---|---|---|
| 4,325,448 A * | 4/1982 | Pivar ..................... | B62K 5/02 180/215 |
| 4,660,345 A * | 4/1987 | Browning ............. | B62D 21/08 164/63 |
| 5,209,541 A | 5/1993 | Janotik | |
| 5,332,281 A | 7/1994 | Janotik et al. | |
| 5,549,352 A | 8/1996 | Janotik et al. | |
| 5,829,219 A | 11/1998 | Sugawara et al. | |
| 6,022,070 A | 2/2000 | Ashina et al. | |
| 6,042,163 A | 3/2000 | Reiffer | |
| 6,099,084 A | 8/2000 | Bungarten et al. | |
| 6,241,310 B1 * | 6/2001 | Patelczyk ............ | B62D 23/005 296/203.01 |
| 6,318,775 B1 | 11/2001 | Heatherington et al. | |
| 6,695,368 B1 | 2/2004 | Weykamp et al. | |

(Continued)

FOREIGN PATENT DOCUMENTS

| DE | 102005026791 A1 | 1/2007 |
|---|---|---|
| EP | 1329374 A1 | 7/2003 |

(Continued)

*Primary Examiner* — Kiran B Patel
(74) *Attorney, Agent, or Firm* — Slater Matsil, LLP (57) ABSTRACT A vehicle body includes a frame member formed to have a tubular shape in an open cross-sectional structure in which one side surface thereof is opened. A fastening portion is formed in a shape to close an opening portion at an end of the frame member. The fastening portion is configured to be fastened to another frame member by a fastener in a surface-contact state.

16 Claims, 10 Drawing Sheets (56) References Cited

U.S. PATENT DOCUMENTS

| | | |
|---|---|---|
| 6,869,136 B2 | 3/2005 | Igarashi et al. |
| 6,926,350 B2 | 8/2005 | Gabbianelli et al. |
| 7,001,097 B2 | 2/2006 | Wang et al. |
| 7,386,938 B2 | 6/2008 | Bruggemann et al. |
| 7,758,107 B2 | 7/2010 | Ratsos et al. |
| 8,371,642 B2 | 2/2013 | Baccouche et al. |
| 8,640,814 B2 | 2/2014 | Deckard et al. |
| 9,505,293 B2 | 11/2016 | Bowles et al. |
| 9,849,920 B2 | 12/2017 | Kawata et al. |
| 10,618,489 B2 | 4/2020 | Hisamura et al. |
| 10,686,304 B2 | 6/2020 | Wagner, III |
| 2001/0000119 A1 | 4/2001 | Jaekel et al. |
| 2006/0059807 A1* | 3/2006 | Zimmerman ........ B62D 23/005 52/239 |
| 2006/0192375 A1 | 8/2006 | Davis et al. |
| 2009/0121106 A1 | 5/2009 | An |
| 2013/0277137 A1 | 10/2013 | Kawaguchi et al. |
| 2015/0252586 A1* | 9/2015 | Schaefer ................. E04H 15/34 135/121 |
| 2015/0259011 A1 | 9/2015 | Deckard et al. |
| 2015/0298739 A1 | 10/2015 | Buschjohann et al. |
| 2017/0136874 A1* | 5/2017 | Harris .................... B60K 17/34 |
| 2019/0208741 A1* | 7/2019 | Huthmaker ............. F16B 5/121 |
| 2021/0171101 A1 | 6/2021 | Kim et al. |
| 2021/0171125 A1 | 6/2021 | Yong et al. |

FOREIGN PATENT DOCUMENTS

| | | |
|---|---|---|
| FR | 2822431 A1 | 9/2002 |
| GB | 2508075 A | 5/2014 |
| JP | H0411581 A | 1/1992 |
| JP | 2013208968 A | 10/2013 |
| KR | 100243584 B1 | 3/2000 |
| KR | 20090035148 A | 4/2009 |
| WO | 2010071664 A1 | 6/2010 |

* cited by examiner

BODY FOR VEHICLE

CROSS-REFERENCE TO RELATED APPLICATIONS

This application claims priority to Korean Patent Application No. 10-2019-0160984, filed on Dec. 5, 2019, which application is hereby incorporated herein by reference.

TECHNICAL FIELD

The present disclosure relates to a vehicle body capable of being assembled in a simple manner and having rigidity.

BACKGROUND

As a body structure of a conventional compact car, a monocoque body structure is applied while only a rear door portion thereof is cut from a general vehicle design.

However, this is a typical monocoque body structure with only a rear door portion thereof being eliminated, and has a disadvantage in that a body is produced by processing parts through a pressing process using a mold and welding the processed parts, and thus, not only large-scale investment is needed for facilities such as a pressing plant, a body welding plant, and a coating plant, but also the degree of freedom is low in terms of design.

In particular, when multiple kinds of vehicle bodies are produced in a small quantity, a lot of changes in design are conventionally required, and accordingly, there are problems in that not only the production cost is inevitably high due to a great increase in the number of molds, but also it is difficult to secure rigidity.

Accordingly, there is a demand for a new body structure not only capable of coping with various designs but also having improved assemblability of the body in smart factory environments and having rigidity.

The contents described as the related art have been provided only to assist in understanding the background of the present disclosure and should not be considered as corresponding to the related art known to those having ordinary skill in the art.

SUMMARY

Embodiments of the present disclosure provide a vehicle body capable of being assembled in a simple manner and having rigidity.

According to an embodiment of the present disclosure, a vehicle body includes a frame member formed to have a tubular shape in an open cross-sectional structure in which one side surface thereof is opened. A fastening portion is formed in a shape to close an opening portion at an end of the frame member, and fastened to another frame member by a fastener in a surface-contact state.

The fastening portion may be formed to extend in a longitudinal direction at an end of a side surface-connecting portion opposite to a side surface-open portion of the frame member, and the fastening portion may be folded toward the opening portion to close the opening portion.

An additional fastening portion partially closing the side surface-open portion may be formed by folding the fastening portion closing the opening portion toward the side surface-open portion.

A cross section of the fastening portion may be formed to match that of the opening portion so that the fastening portion and the opening portion are joined to each other at a matching area.

Flange portions may be formed by folding side surface-blocking portions at end portions thereof toward the side surface-open portion, the side surface-blocking portions extending from the side surface-connecting portion.

Both ends of a mounting plate may be joined to the both flange portions, respectively, to prevent a distance between the both side surface-blocking portions from being increased or decreased.

The frame member may have a rigidity providing portion formed to have a closed cross-sectional structure at an edge of an inner wall surface thereof in a longitudinal direction.

In some exemplary embodiments, one ends of the frame members may be connected to front pillar members extending from a front side to a roof side on both sides of the vehicle body. The other ends of the frame members may be connected to rear pillar members extending from a rear side to the roof side on the both sides of the vehicle body. In addition, middle portions of the frame members may be bent and disposed to face areas where the front pillar members are connected to the rear pillar members.

The fastening portions of the frame members may be fastened to rear ends of front pillar members on both sides; a lower surface of the front pillar member at the rear end thereof may be fastened to an upper surface of rear pillar member at an upper end thereof; the upper end of the rear pillar member may be bent toward the frame member; and the additional fastening portion of the frame member may be positioned to overlap the upper surface of the rear pillar member in the bent portion such that the bent portion and the additional fastening portion are fastened by allowing a bolt to penetrate therethrough.

Side reinforcing members extending from a front side on both sides of the vehicle body through a lower side of the vehicle body to a rear side on the both sides of the vehicle body may be connected to rear pillar members extending from the rear side to a roof side on the both sides of the vehicle body, and may be connected to one ends of the frame members. The other ends of the frame members may be connected to a connecting member connected between the rear pillar members, and middle portions of the frame members may be bent and disposed to face areas where the connecting member and the side reinforcing members are connected to the rear pillar members.

The frame member may be a reinforcing frame member connected in a bridge form between two members. One end of the reinforcing frame member may be connected to a side surface of a side reinforcing member at an end thereof, while the side reinforcing member is connected to a middle portion of the rear pillar member. The other end of the reinforcing frame member may be connected to a connecting member connected between the both rear pillar members at the middle portion thereof. A middle portion of the reinforcing frame member may be bent, and the bent surface may be disposed to face an area where the connecting member and the side reinforcing member is connected to the rear pillar member.

According to an embodiment of the present disclosure, a method of manufacturing a vehicle body includes: a material preparing step of preparing a plate-shaped material having side surface-blocking portions formed on both sides of a side surface-connecting portion, and a fastening portion formed at an end of the side surface-connecting portion to extend such that the side surface-connecting portion is longer than the side surface-blocking portions; a side surface portion folding step of folding the side surface-blocking portions in the same direction on the basis of the side surface-connecting portion to form the plate-shaped material to have a tubular shape in an open cross-sectional structure in which one side surface thereof is opened; and a fastening portion folding step of folding the fastening portion toward the folded side surface-blocking portions to close an opening portion formed at the end and couple the fastening portion to the side surface-blocking portions to thereby form a frame member.

In the material preparing step, a fastening hole may be formed in the fastening portion.

In the side surface portion folding step, after the both side surface-blocking portions are folded, flange portions may be formed by folding end portions of the both side surface-blocking portions in a direction to face each other.

DETAILED DESCRIPTION OF ILLUSTRATIVE EMBODIMENTS

Preferred embodiments of the present disclosure will be described in detail below with reference to the accompanying drawings.

A frame member wo according to the present disclosure is applicable to a body 10 of a subcompact electric vehicle. A plurality of frame members wo are organically connected to one another to configure a module for each part, and the modules are connected to one another to form the body 10.

Figure 1:
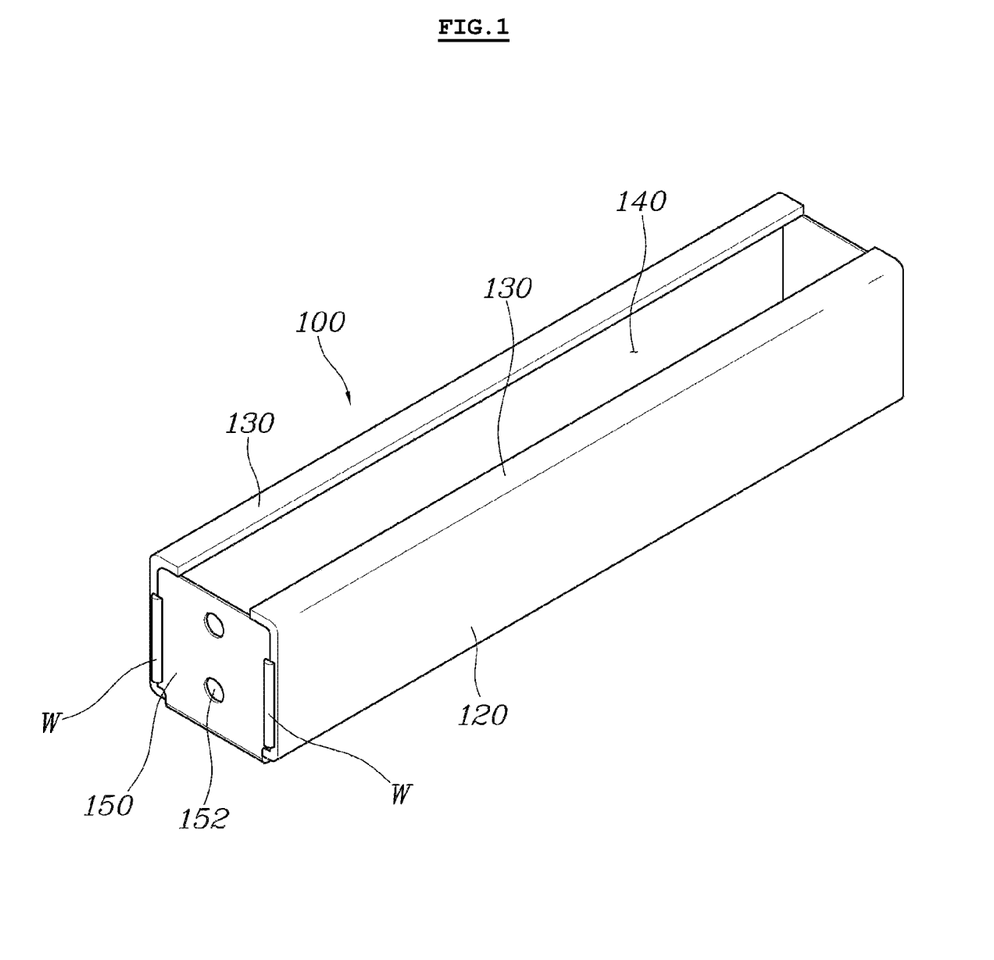
FIG. 1 is a view illustrating a shape of a frame member forming a skeleton of a vehicle body according to the present disclosure.
Figure 2:
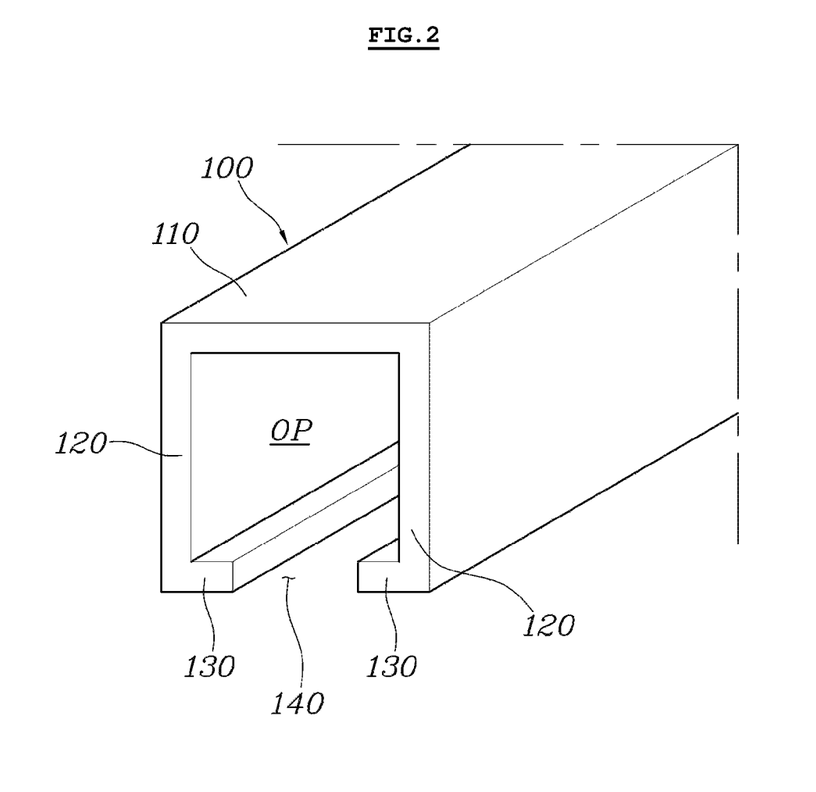
FIG. 2 a view illustrating a cross section of a frame member according to the present disclosure.

FIG. 1 illustrates a shape of a frame member wo forming a skeleton of a body 10 according to the present disclosure, and FIG. 2 illustrates a cross section of a frame member wo according to the present disclosure.

Referring to FIGS. 1 and 2, the frame member wo according to the present disclosure is formed to have a tubular shape in an open cross-sectional structure in which one side surface thereof is opened.

Further, a fastening portion 150 is formed in a shape to close an opening portion OP at an end of the frame member 100, and the fastening portion 150 is fastened to another frame member 100 by a fastener 180 in a surface-contact state.

For example, the frame member wo is formed to have a "⊏"-shaped cross section as a cross section perpendicular to a longitudinal direction thereof. Among the peripheral surfaces of the frame member 100, three surfaces are closed and one surface is opened.

The frame member 100 may preferably be formed in a shape of a straight tube that is formed to be long in the longitudinal direction, but the frame member 100 may optionally be formed in a shape of a curved tube that is formed to be bent at a middle portion thereof.

In addition, the fastener 180 may be a bolt/nut or a rivet, and a fastening hole 152 may be formed in the fastening portion 150 so that the bolt or rivet may pass through the fastening portion 150 to facilitate the fastening.

That is, according to the above-described configuration, an in-line fastening process is implemented by inserting the bolt into the fastening hole 152 through the opened portion of the frame member wo in a state where an outer surface of the fastening portion 150 is in surface contact with another frame member 100 to be connected to the frame member 100, and then tightening the bolt using a tool, thereby facilitating and simplifying a coupling process between members and as a result improving assemblability of the body 10.

Furthermore, the body 10 is configured by assembling members including the frame member 100 in a bolting or riveting manner. Thus, large-scale pressing, body welding, and coating plants are unnecessary. As a result, it is possible to appropriately cope with the smart factory environments, and it also is possible to simplify the process of assembling the body 10, thereby improving assemblability. In addition, it is possible to greatly improve torsional rigidity at an assembled portion, thereby securing strength and rigidity of the body 10.

Figure 3:
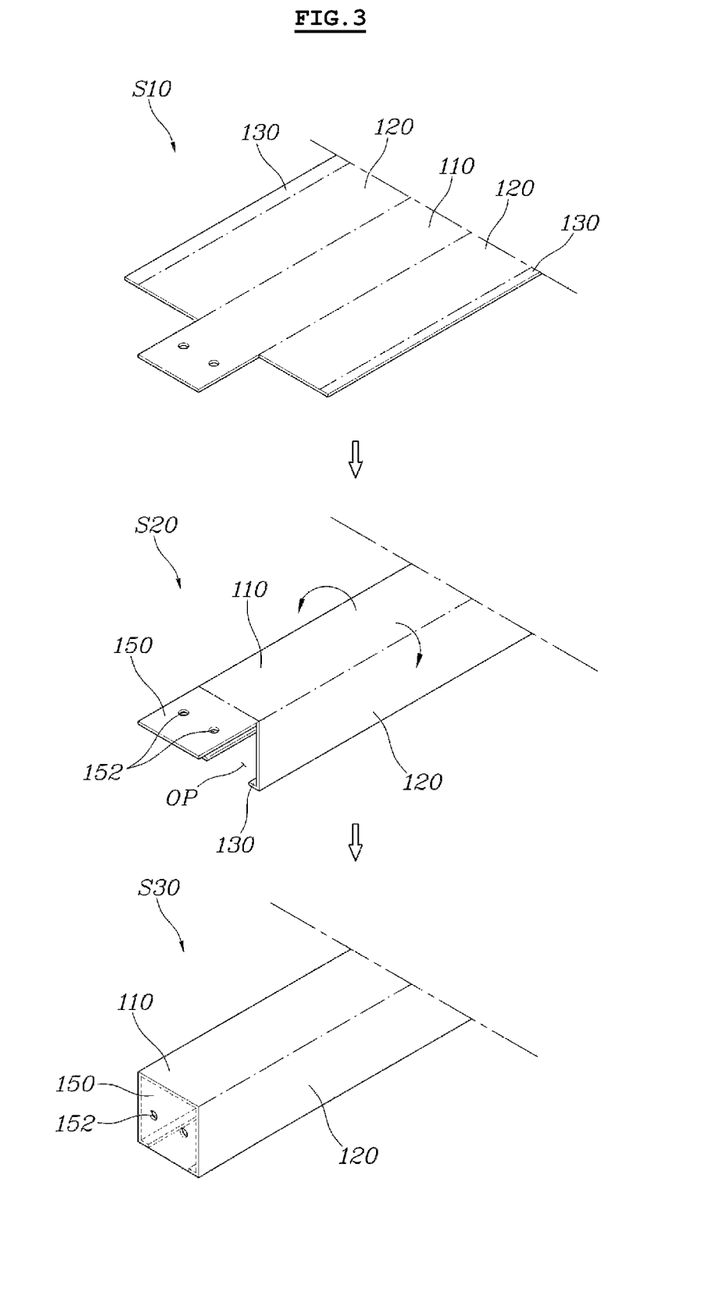
FIG. 3 is a view for explaining a method of manufacturing a frame member through a folding process according to the present disclosure.

FIG. 3 is a view for explaining a method of manufacturing a frame member 100 through a folding process according to the present disclosure.

With reference to the drawing, the structure in which both ends of the frame member wo are closed by the fastening portion 150 will be described. The fastening portion 150 is formed to extend in the longitudinal direction at an end of a side surface-connecting portion 110 opposite to a side surface-open portion 140 of the frame member 100.

Accordingly, the fastening portion 150 is folded toward the opening portion OP to close the opening portion OP.

For example, a distance between both ends of the side surface-connecting portion 110 is longer than that between both ends of a side surface-blocking portion 120 in the longitudinal direction, and the portion formed to be long is the fastening portion 150.

Accordingly, the side surface-blocking portions 120 formed on both sides of the side surface-connecting portion 110 are folded in a vertical direction, and the fastening portion 150 is folded at an area of the side surface-connecting portion 110 adjoining an end of the side surface-blocking portion 120, thereby blocking the opening portions OP at the both ends of the frame member 100.

That is, it is possible to secure the rigidity of the fastening portion 150 by integrally forming the fastening portion 150 with the frame member 100, and it is also possible to manufacture the frame member 100 at a low cost in a simple way by folding and bending the fastening portion 150 to manufacture the frame member 100, thereby effectively coping with the smart factory environments.

For reference, when the frame member 100 manufactured as described above is made of a steel material, a rust inhibitor may be coated on a surface of the frame member 100 for inhibition of rust. However, when the frame member 100 is made of an aluminum material, the process of coating the rust inhibitor may be omitted.

Figure 4:
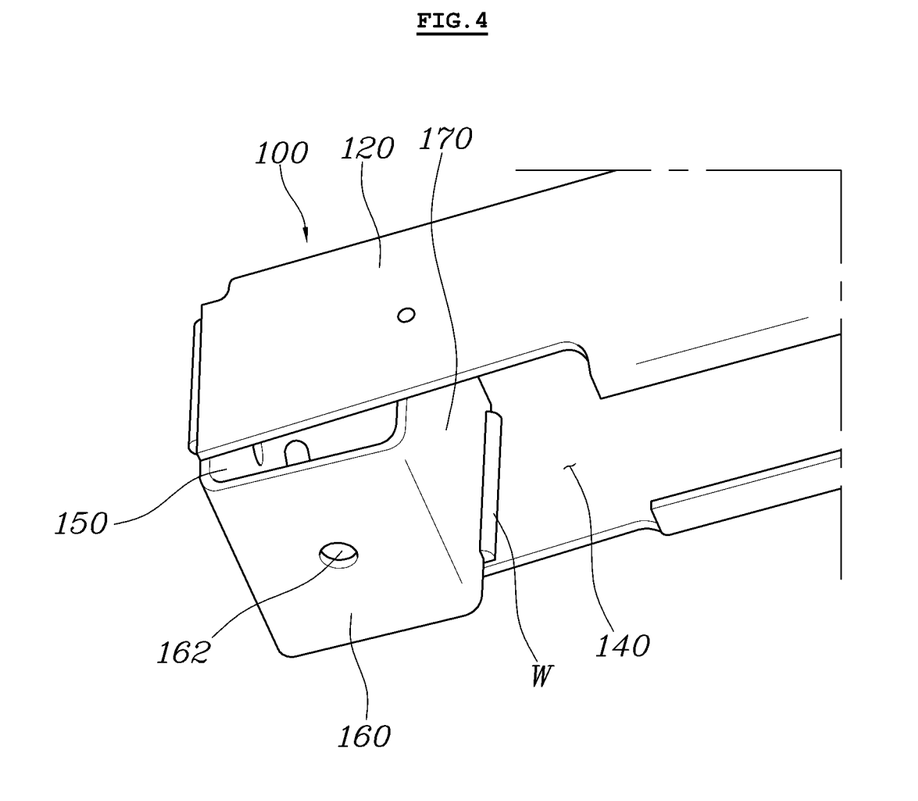
FIG. 4 is a view illustrating a frame member having a fastening portion folded in two stages according to the present disclosure.

FIG. 4 is a view illustrating a frame member 100 having a fastening portion 150 folded in two stages according to the present disclosure.

Referring to the drawing, an additional fastening portion 160 partially closing the side surface-open portion 140 may be formed by folding the fastening portion 150 closing the opening portion OP toward the side surface-open portion 140.

For example, the side surface-blocking portions 120 formed on the both sides of the side surface-connecting portion 110 are folded in a vertical direction, and a distance between the both ends of the side surface-connecting portion 110 is greater than that between the both ends of the side surface-blocking portion 120 in the longitudinal direction. The portion formed to be long is the fastening portion 150 and the additional fastening portion 160.

Accordingly, the side surface-blocking portions 120 formed on the both sides of the side surface-connecting portion 110 are folded in a vertical direction, and the fastening portion 150 is folded at an area of the side surface-connecting portion 110 adjoining an end of the side surface-blocking portion 120, thereby blocking the opening portions OP at the both ends of the frame member 100.

In addition, the fastening portion 150 blocking the opening portion OP of the frame member 100 is folded at an end thereof toward the side surface-open portion 140 to partially block the side surface-open portion 140. The portion blocking the side surface-open portion 140 is the additional fastening portion 160. In this case, the additional fastening portion 160 may have a fastening hole 162 therein, like the fastening portion 150.

In addition, a finishing portion 170 is formed by folding the additional fastening portion 160 at an end thereof again toward the side surface-connecting portion 110 to enter the "⊏"-shaped internal space, and edges of the finishing portion 170 are joined to inner surfaces of the side surface-blocking portions 120 and an inner surface of the side surface-connecting portion 110, respectively, by welding W such as $CO_2$ welding, thereby securing the rigidity of the fastening portion 150 and the additional fastening portion 160.

That is, not only the fastening portion 150 may be coupled to another frame member 100 in a surface-contact state, but also the additional fastening portion 160 may be coupled to another frame member 100 in a surface-contact state depending on the structure of the body 10. This configuration is simply applicable to major areas requiring rigidity in the body 10, thereby making it possible to cope with a variety of designs for the body 10.

In addition, according to the present disclosure as illustrated in FIG. 1, a cross section of the fastening portion 150 is formed to match that of the opening portion OP so that the fastening portion 150 and the opening portion are joined to each other at the matching area.

For example, the fastening portion 150 is formed in a quadrangular shape, and the fastening portion 150 is folded while an outer edge of the fastening portion 150 corresponds to an inner edge of the opening portion OP. In the folded state, the outer edge of the fastening portion 150 and the inner edge of the opening portion OP are joined by welding W such as $CO_2$ welding at an area where they meet, thereby securing the rigidity of the fastening portion 150.

Meanwhile, the fastening portion 150 may be formed in a plate shape to have a cross-sectional area larger than that of the opening portion OP. In this case, the fastening portion 150 and the opening portion OP may be joined by welding W along a line where they are in contact with each other.

Referring to FIG. 2, flange portions 130 may be formed by folding the side surface-blocking portions 120 at end portions thereof toward the side surface-open portion 140, the side surface-blocking portions 120 extending from the side surface-connecting portion 110.

For example, the flange portions 130 may be formed by folding the end portions of the both side surface-blocking portions 120 in a direction to face each other.

That is, the flange portions 130 are formed in a shape to be bent from the side surface-blocking portions 120 toward the side surface-open portion 140, thereby not only securing rigidity at the end portions of the side surface-blocking portions 120, but also acting to provide a seating surface for a mounting plate 200, which will be described below, to be mounted thereon.

Figure 5:
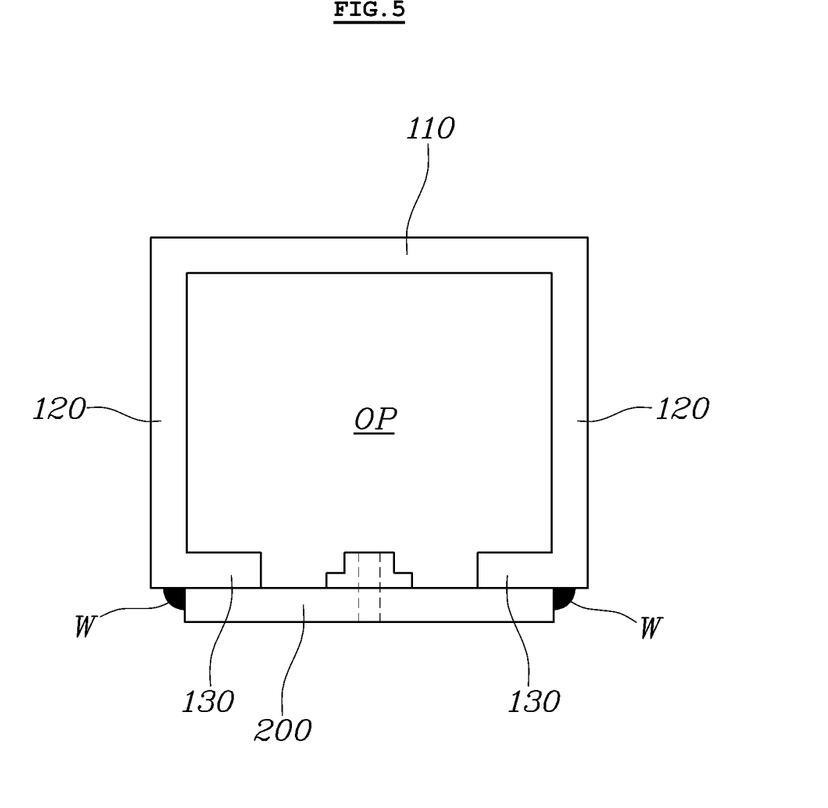
FIG. 5 is a view illustrating a cross section of a frame member with a mounting plate coupled thereto according to the present disclosure.

FIG. 5 is a view illustrating a cross section of a frame member 100 with a mounting plate 200 coupled thereto according to the present disclosure.

Referring to the drawing, both ends of the mounting plate 200 are joined to the both flange portions 130, respectively, to prevent a distance between the both side surface-blocking portions 120 from being increased or decreased.

That is, when it is required to mount fittings or other parts in the opened side surface portion of the frame member 100, the mounting plate 200, which is a separate component, is assembled on the both flange portions 130, and the parts are coupled onto the mounting plate 200, thereby not only providing a seating surface for mounting the parts, but also securing additional rigidity by preventing a distance between the both side surface-blocking portions 120 from being increased or decreased.

Figure 6:
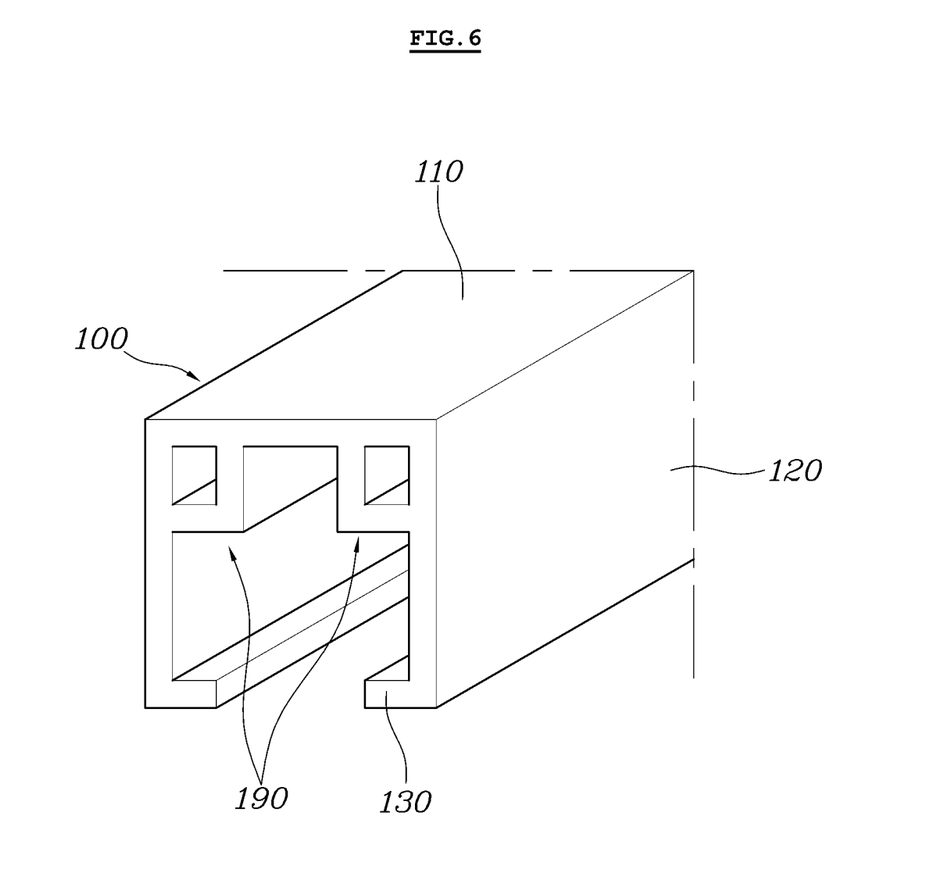
FIG. 6 is a view illustrating a cross section of a frame member in a state in which a rigidity providing portion is formed therein according to the present disclosure.

FIG. 6 is a view illustrating a cross section of a frame member 100 in a state in which a rigidity providing portion 190 is formed therein according to the present disclosure.

Referring to the drawing, the frame member 100 according to the present disclosure may have a rigidity providing portion 190 formed to have a closed cross-sectional structure at an edge of an inner wall surface thereof in the longitudinal direction.

For example, the rigidity providing portion 190 having a rectangular closed cross-sectional structure is formed at an edge area where the side surface-connecting portion 110 and the side surface-blocking portion 120 meet each other on an inner surface of the frame member 100 along the longitudinal direction of the frame member 100.

This is applicable when the frame member 100 is made of an aluminum material and manufactured by an extrusion process, and additional rigidity is secured by applying a closed cross-sectional structure to the frame member 100 therein.

Figure 7:
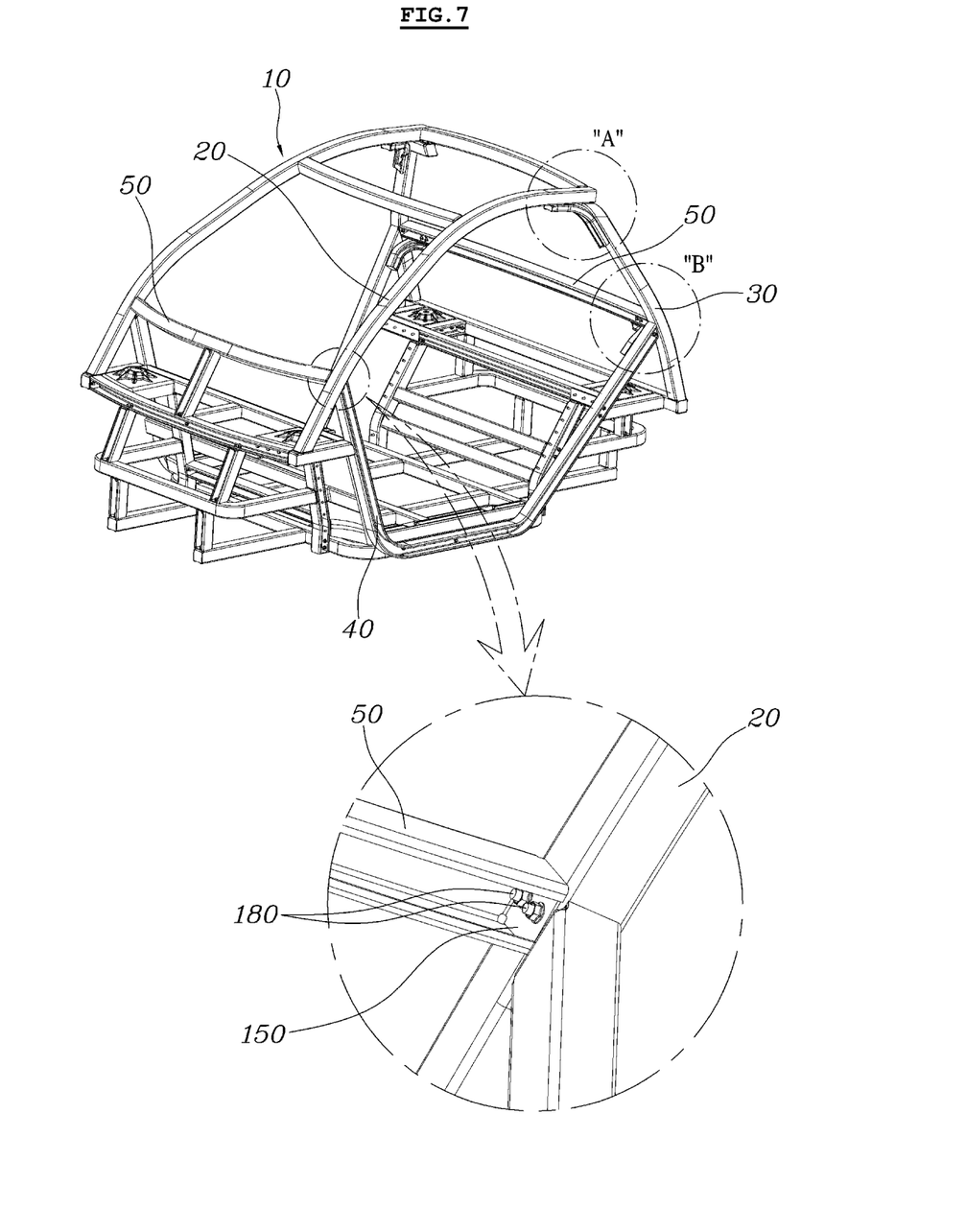
FIG. 7 is a view illustrating a coupled structure of a frame member applied to a vehicle body according to the present disclosure.

Meanwhile, FIG. 7 is a view illustrating a coupled structure of a frame member 100 applied to a body 10 according to the present disclosure. The body 10 is assembled in a simply manner by inline bolting between members without any separate joint structure. For reference, in the drawing, a connecting member 50 is coupled to a front pillar member 20, but all of these members have the same structure as the frame member 100 according to the present disclosure while being different only in expression. Thus, the coupled structure of the frame member 100 according to the present disclosure will be described to explain a coupled structure of these members.

Referring to the drawing, the fastening portion 150 is formed in a shape to cover an end of the connecting member 50, and a bolt is inserted into the fastening hole 152 formed in the fastening portion 150 in a state where an outer surface of the fastening portion 150 is in contact with one surface of the front pillar member 20.

In this case, one side surface of the connecting member 50 is opened, and the bolt may be tightened using a tool through the opened side surface portion, thereby simplifying a process of assembling the connecting member 50 and a side reinforcing member 40.

Figure 8:
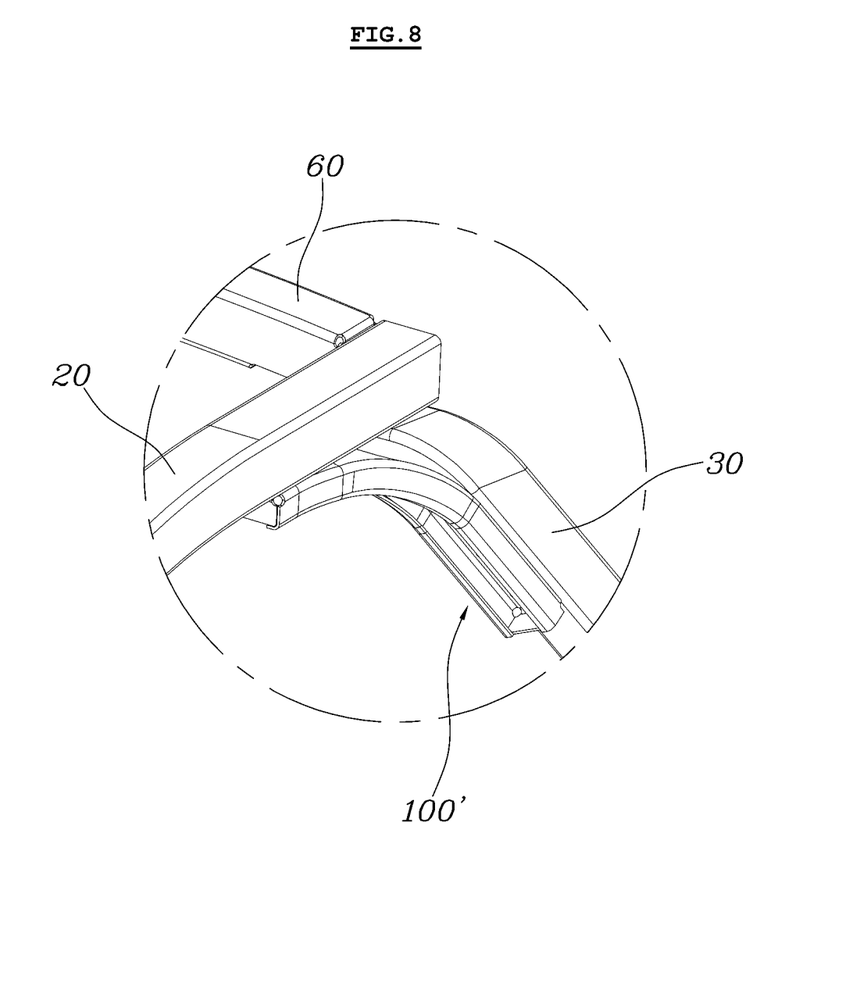
FIG. 8 is a view illustrating part A of FIG. 7 for a structure at an area where front and rear pillar members are connected to each other in an embodiment.

Meanwhile, FIG. 8 is a view illustrating part A of FIG. 7, where the frame member 100 formed in a bent state is applied to an area where the front pillar member 20 is joined to a rear pillar member 30 according to the present disclosure.

That is, as described above, the structure of the vehicle body according to the present disclosure is configured by connecting the frame members 100 to each other. However, the frame members 100 configuring the structure of the vehicle body may be utilized to be frame members 100' as reinforcing materials in a bridge form for connection, thereby securing additional rigidity at the connection area.

For reference, the reinforcing frame member 100' applied in the bridge form based on the frame member according to the present disclosure is bent at a middle portion thereof, with both ends thereof being connected to the respective members desired to connect.

Referring to the drawing, one ends of the reinforcing frame members 100' are connected to the front pillar members 20 extending from a front side to a roof side on the both sides of the body 10, and the other ends of the reinforcing frame members 100' are connected to the rear pillar members 30 extending from a rear side to the roof side on the both sides of the body 10.

For example, a bolting hole is formed at one end of the side surface-connecting portion no so that one end of the side surface-connecting portion 110 is fastened to one surface of the front pillar member 20 by bolting, and a bolting hole is formed in the other end of the side surface-connecting portion 110 so that the other end of the side surface-connecting portion 110 is fastened to the rear pillar member 30 by bolting.

Further, the middle portion of the reinforcing frame member 100' is bent and disposed to face an area where the front pillar member 20 and the rear pillar member 30 are connected to each other.

That is, the both ends of the reinforcing frame member 100' are connected to the front pillar member 20 and the rear pillar member 30, respectively, and the reinforcing frame member 100' acts as a joint by positioning an outer curved surface of the bent portion of the reinforcing frame member 100' at the area where these members are connected to each other, which is very important for the rigidity of the body 10, thereby securing rigidity at the connection area.

Figure 9:
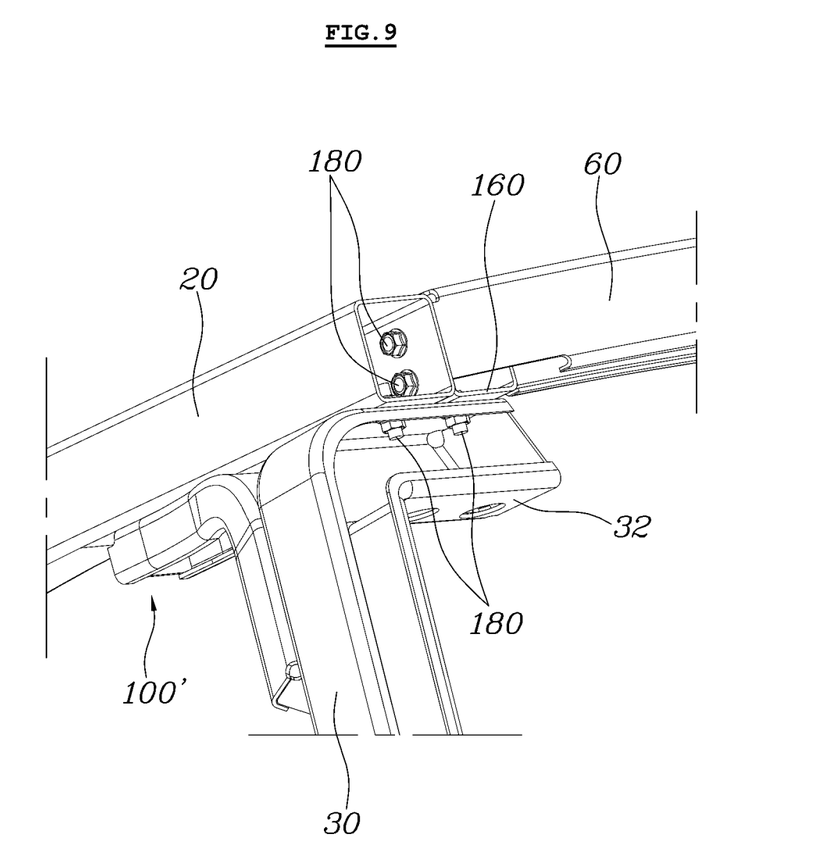
FIG. 9 is a view illustrating part A of FIG. 7 for a structure at an area where front and rear pillar members are connected to each other in another embodiment.

Meanwhile, FIG. 9 is a view illustrating part A of FIG. 7 for a structure in another embodiment.

Referring to the drawing, the fastening portions 150 formed at both ends of a rear roof member 60 are fastened to rear ends of the both front pillar members 20 in a surface-contact state by bolting therebetween. Further, an upper surface of the rear pillar member 30 at an upper end thereof is fastened to a lower surface of the front pillar member 20 at the rear end thereof in a surface-contact state by bolting.

Here, the structure of the frame member 100 illustrated in FIG. 4 is applied to the rear roof member 60, and the additional fastening portions 160 are formed under the rear roof member 60 at both ends thereof.

Accordingly, upper ends of the both rear pillar members 30 are bent toward the rear roof member 60, and an upper surface of the bent portion 32 is positioned to overlap under the additional fastening portion 160 formed in the rear roof member 60.

Therefore, the bent portion 32 of the rear pillar member 30 and the additional fastening portion 160 of the rear roof member 60 may be fastened to each other by allowing a bolt to penetrate therethrough.

In addition, the frame member according to the present disclosure may be utilized as a reinforcing frame member 100' connected between the front pillar member 20 and the rear pillar member 30 in a bridge form to act as a joint.

That is, one ends of the reinforcing frame members 100' are connected to the front pillar members 20 extending from the front side to the roof side on the both sides of the body 10, and the other ends of the reinforcing frame members 100' are connected to the rear pillar members 30 extending from the rear side to the roof side on the both sides of the body 10.

For example, a bolting hole is formed at one end of the side surface-connecting portion 110 formed in the reinforcing frame member 100' so that the one end of the side surface-connecting portion 110 is fastened to one surface of the front pillar member 20 by bolting, and a bolting hole is formed at the other end of the side surface-connecting portion 110 so that the other end of the side surface-connecting portion no is fastened to the rear pillar member 30 by bolting.

Further, the middle portion of the reinforcing frame member 100' is bent and disposed to face an area where the front pillar member 20 and the rear pillar member 30 are connected to each other.

That is, the reinforcing frame member 100' is connected at the area where the front pillar member 20 and the rear pillar member 30 are connected to each other, which is very important for the rigidity of the body 10, to act as a joint. In addition, it is possible to more effectively secure rigidity at the connection area by overlapping the front pillar member 20 and the rear roof member 60 on the rear pillar member 30 having the additional fastening portion 160 and additionally fastening them to each other by bolting.

Figure 10:
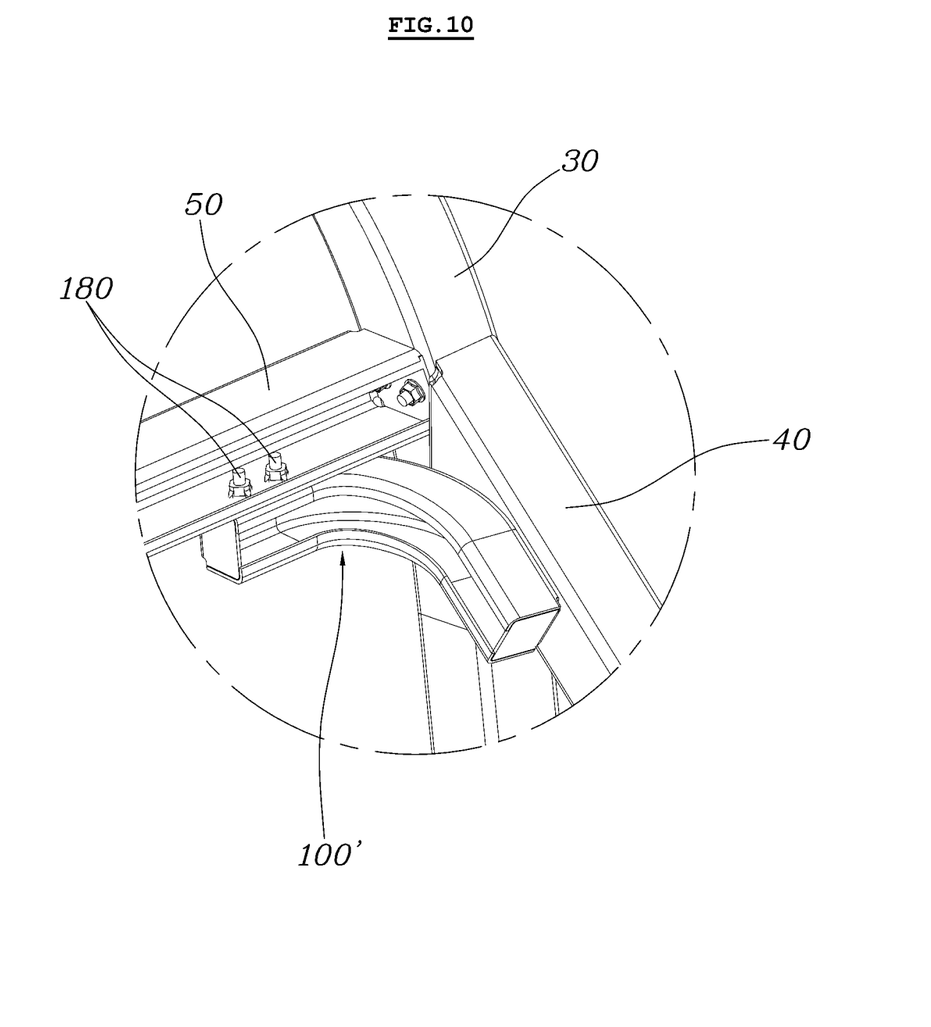
FIG. 10 is a view illustrating part B of FIG. 7, where a reinforcing frame member is bent and the bent reinforcing frame member is applied to a joint area between a rear pillar member and a side reinforcing member.

FIG. 10 is a view illustrating part B of FIG. 7, where a reinforcing frame member 100' is bent, and the bent reinforcing frame member 100' is applied to a joint area between a rear pillar member 30 and a side reinforcing member 40 according to the present disclosure.

Referring to the drawing, the side reinforcing members 40 extending from the front side on the both sides of the body 10 through a lower side of the body 10 to the rear side on the both sides of the body 10 are connected to the rear pillar members 30 extending from the rear side to the roof side on the both sides of the body 10, and are connected to one ends of the reinforcing frame members 100'.

The other ends of the reinforcing frame members 100' are connected to the connecting member 50 connected between the both rear pillar members 30.

For example, a bolting hole is formed at one end of the side surface-connecting portion 110 formed in the reinforcing frame member 100' so that the one end of the side surface-connecting portion 110 is fastened to one surface of the side reinforcing member 40 by bolting, and a bolting hole is formed at the other end of the side surface-connecting portion 110 so that the other end of the side surface-connecting portion 110 is fastened to the connecting member 50 by bolting.

In particular, the middle portion of the reinforcing frame member 100' is bent and disposed to face an area where the connecting member 50 and the side reinforcing member 40 are connected to the rear pillar member 30.

That is, the both ends of the reinforcing frame member 100' are connected to the connecting member 50 and the side reinforcing member 40, respectively, and the reinforcing frame member 100' acts as a joint by positioning an outer curved surface of the bent portion of the reinforcing frame member 100' at the area where these members are connected to each other, which is very important for the rigidity of the body 10, thereby securing rigidity at the connection area.

For reference, the connecting member 50 may be applied to connect the members or other connecting members, may be applied at an area for assembling chassis/interior/external parts, or may be locally applied at an area where reinforcement of rigidity is required.

Meanwhile, a method of manufacturing a frame member 100 through a bending process according to the present disclosure includes a material preparing step (S10), a side surface portion folding step (S20), and a fastening portion folding step (S30).

Referring to FIG. 3, in the material preparing step (S10), a plate-shaped material is prepared, the plate-shaped material having side surface-blocking portions 120 formed on both sides of a side surface-connecting portion 110, and a fastening portion 150 formed at an end of the side surface-connecting portion 110 to extend such that the side surface-connecting portion no is longer than the side surface-blocking portions 120.

In this case, the material may have a fastening hole 152 formed in the fastening portion 150.

In the side surface portion folding step (S20), the side surface-blocking portions 120 are folded in the same direction on the basis of the side surface-connecting portion no to form the plate-shaped material to have a tubular shape in an open cross-sectional structure in which one side surface thereof is opened.

In the side surface portion folding step (S20), after the both side surface-blocking portions 120 are folded, flange portions 130 may be formed by folding end portions of the both side surface-blocking portions 120 in a direction to face each other.

Subsequently, in the fastening portion folding step (S30), the fastening portion 150 may be folded toward the folded side surface-blocking portions 120 to close an opening portion OP formed at the end and couple the fastening portion 150 to the side surface-blocking portions 120 to thereby form a frame member 100.

That is, the plate-shaped material for manufacturing the frame member 100 is secured by performing a blanking process.

Based on the secured material, the both side surface-blocking portions 120 are folded on the basis of the side surface-connecting portion 110 and then the flange portions 130 extending from the side surface-blocking portions 120 are formed by folding the side surface-blocking portions 120 in a direction to face each other.

Subsequently, the fastening portion 150 formed to extend at the end of the side surface-connecting portion 110 is folded toward the opening portion OP formed at the end having a "⊏"-shaped cross section by folding the side surface-blocking portions 120, and then an outer edge of the fastening portion 150 and an inner edge of the opening portion OP are joined by welding W, thereby manufacturing the frame member 100.

Accordingly, the frame member 100 manufactured as described above is capable of facilitating and simplifying a coupling process between members and as a result improving assemblability of the body 10 by implementing an inline fastening process, in which the bolt is inserted into the fastening hole 152 through the opened portion of the frame member 100 in a state where an outer surface of the fastening portion 150 is in surface contact with the another frame member 100 to which the frame member 100 is connected, and then the bolt is tightened using a tool.

Furthermore, since the frame member 100 is manufactured through a process of folding and bending the fastening portion 150, it is possible to manufacture the frame member 100 at a low cost in a simple way, thereby effectively coping with the smart factory environments.

In addition, since the body 10 is configured by assembling members including the frame member 100 in a bolting or riveting manner, large-scale pressing, body welding, and coating factories are unnecessary. As a result, it is possible to appropriately cope with the smart factory environments, and it is possible to simplify the process of assembling the body 10, thereby improving assemblability. In addition, it is possible to greatly improve torsional rigidity at an assembled portion, thereby securing strength and rigidity of the body 10.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A vehicle body comprising:
   a frame member formed to have a tubular shape in an open cross-sectional structure in which one side surface thereof is opened; and
   a fastening portion formed in a shape to close an opening portion at an end of the frame member, the fastening portion configured to be fastened to another frame member by a fastener in a surface-contact state.

2. The vehicle body of claim 1, wherein the fastening portion is formed to extend in a longitudinal direction at an end of a side surface-connecting portion opposite to a side surface-open portion of the frame member; and
   wherein the fastening portion is folded toward the opening portion to close the opening portion.

3. The vehicle body of claim 2, wherein an additional fastening portion partially closing the side surface-open portion is formed by folding the fastening portion closing the opening portion toward the side surface-open portion.

4. The vehicle body of claim 2, wherein a cross section of the fastening portion is formed to match that of the opening portion so that the fastening portion and the opening portion are joined to each other at a matching area.

5. The vehicle body of claim 2, wherein two flange portions are formed by folding side surface-blocking portions at end portions thereof toward the side surface-open portion, the side surface-blocking portions extending from the side surface-connecting portion.

6. The vehicle body of claim 5, wherein ends of a mounting plate are joined to both flange portions, respectively, to prevent a distance between the side surface-blocking portions from being increased or decreased.

7. The vehicle body of claim 1, wherein the frame member has a rigidity providing portion formed to have a closed cross-sectional structure at an edge of an inner wall surface thereof in a longitudinal direction.

8. The vehicle body of claim 1, wherein the vehicle body includes a plurality of frame members and a plurality of fasteners.

9. The vehicle body of claim 8, wherein first ends of the frame members are connected to front pillar members extending from a front side to a roof side on both sides of the vehicle body;
wherein other ends of the frame members are connected to rear pillar members extending from a rear side to the roof side on the both sides of the vehicle body; and
wherein middle portions of the frame members are bent and disposed to face areas where the front pillar members are connected to the rear pillar members.

10. The vehicle body of claim 8, wherein side reinforcing members extending from a front side on both sides of the vehicle body through a lower side of the vehicle body to a rear side on the both sides of the vehicle body are connected to rear pillar members extending from the rear side to a roof side on the both sides of the vehicle body, and are connected to first ends of the frame members;
wherein other ends of the frame members are connected to a connecting member connected between the rear pillar members; and
wherein middle portions of the frame members are bent and disposed to face areas where the connecting member and the side reinforcing members are connected to the rear pillar members.

11. A vehicle body comprising:
a plurality of frame members each formed to have a tubular shape in an open cross-sectional structure in which one side surface thereof is opened;
a plurality of fastening portions each formed in a shape to close an opening portion at an end of a respective frame member; and
a plurality of fasteners fastening the frame members by the fastening portions so that each frame member is in a surface-contact state with another frame member.

12. The vehicle body of claim 11, wherein first ends of the frame members are connected to front pillar members extending from a front side to a roof side on both sides of the vehicle body.

13. The vehicle body of claim 12, wherein other ends of the frame members are connected to rear pillar members extending from a rear side to the roof side on the both sides of the vehicle body.

14. The vehicle body of claim 13, wherein middle portions of the frame members are bent and disposed to face areas where the front pillar members are connected to the rear pillar members.

15. The vehicle body of claim 11, wherein side reinforcing members extending from a front side on both sides of the vehicle body through a lower side of the vehicle body to a rear side on the both sides of the vehicle body are connected to rear pillar members extending from the rear side to a roof side on the both sides of the vehicle body, and are connected to ends of the frame members.

16. The vehicle body of claim 15, wherein other ends of the frame members are connected to a connecting member connected between the rear pillar members, and middle portions of the frame members are bent and disposed to face areas where the connecting member and the side reinforcing members are connected to the rear pillar members.

* * * * *